US012591785B2

(12) United States Patent
Conte et al.

(10) Patent No.: US 12,591,785 B2
(45) Date of Patent: Mar. 31, 2026

(54) METHOD AND APPARATUS FOR FEDERATED TRAINING

(71) Applicant: Nokia Solutions and Networks Oy, Espoo (FI)

(72) Inventors: Alberto Conte, Massy (FR); Dario Bega, Munich (DE); Tejas Subramanya, Munich (DE); Abdelrahman Abdelkader, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/408,775

(22) Filed: Jan. 10, 2024

(65) Prior Publication Data

US 2024/0249203 A1 Jul. 25, 2024

(30) Foreign Application Priority Data

Jan. 20, 2023 (FI) ..................................... 20235062

(51) Int. Cl.
*G06N 3/098* (2023.01)
*G06N 20/20* (2019.01)
*H04L 9/00* (2022.01)

(52) U.S. Cl.
CPC ............. *G06N 3/098* (2023.01); *H04L 9/008* (2013.01); *G06N 20/20* (2019.01)

(58) Field of Classification Search
CPC ......... G06N 3/098; G06N 20/20; H04L 9/008
See application file for complete search history.

(56) References Cited

U.S. PATENT DOCUMENTS 12,001,577 B1 * 6/2024 Xiong ...................... G06N 3/04
2021/0133577 A1 5/2021 Srinivasan et al.
(Continued)

FOREIGN PATENT DOCUMENTS

WO 2022/042848 A1 3/2022
WO 2023/006205 A1 2/2023

OTHER PUBLICATIONS

Office action received for corresponding Finnish Patent Application No. 20235062, dated Feb. 6, 2025, 15 pages.
(Continued)

*Primary Examiner* — Shirley X Zhang
(74) *Attorney, Agent, or Firm* — Nokia Technologies Oy

(57) ABSTRACT

An apparatus for federated training, the apparatus comprising means for:

Transmitting a first implementation (22) of a data-processing model to a first distributed trainer, wherein the first implementation of the data-processing model comprises a first hidden part (221) and a first open part (222), Transmitting a second implementation (23) of the data-processing model to a second distributed trainer, wherein the second implementation of the data-processing model comprises a second hidden part (231) and a second open part (232), Receiving a first training gradient from the first distributed trainer and a second training gradient from the second distributed trainer, wherein the first gradient relates to the first open part of the first implementation of the data-processing model, wherein the second gradient relates to the second open part of the second implementation of the data-processing model, Updating the data-processing model using the first gradient and the second gradient.

13 Claims, 3 Drawing Sheets

(56) References Cited

U.S. PATENT DOCUMENTS

| | | | | |
|---|---|---|---|---|
| 2022/0138626 | A1* | 5/2022 | Bi | H04L 9/008 706/12 |
| 2022/0300618 | A1 | 9/2022 | Ding et al. | |
| 2022/0405383 | A1* | 12/2022 | Liu | G06N 3/04 |
| 2023/0237321 | A1* | 7/2023 | Cirillo | G06N 3/0895 706/15 |
| 2023/0325713 | A1 | 10/2023 | Mwanje et al. | |
| 2023/0351245 | A1 | 11/2023 | Subramanya et al. | |

OTHER PUBLICATIONS

Extended European Search Report received for corresponding European Patent Application No. 24151633.5, dated Jun. 21, 2024, 9 pages.

Liang et al., "OmniLytics: A Blockchain-based Secure Data Market for Decentralized Machine Learning", arXiv, Sep. 12, 2021, 10 pages.

Kuznetsov et al., "SecureFL: Privacy Preserving Federated Learning with SGX and TrustZone", IEEE/ACM Symposium on Edge Computing (SEC), Dec. 14-17, 2021, pp. 55-67.

Roth et al."Federated Learning with Homomorphic Encryption", Nvidia Developer, Retrieved on Jan. 16, 2023, Webpage available at : https://developer.nvidia.com/blog/federated-learning-with-homomorphic-encryption/.

European Provisional Application No. 22160427.5, "Apparatus, Method, and Computer Program", filed on Mar. 7, 2022, pp. 1-34.

McMahan et al., "Communication-Efficient Learning of Deep Networks from Decentralized Data", Proceedings of the 20th International Conference on Artificial Intelligence and Statistics (AISTATS), vol. 54, Apr. 20-22, 2017, 10 pages.

McMahan et al."Federated Learning: Collaborative Machine Learning without Centralized Training Data", Google Research, Retrieved on Jan. 16, 2023, Webpage available at : https://blog.research.google/2017/04/federated-learning-collaborative.html.

McMahan et al."Federated Learning with Formal Differential Privacy Guarantees", Google Research, Retrieved on Jan. 16, 2023, Webpage available at : https://blog.research.google/2022/02/federated-learning-with-formal.html.

"3rd Generation Partnership Project; Technical Specification Group Services and System Aspects; Management and orchestration; Artificial Intelligence / Machine Learning (AI/ML) management (Release 17)", 3GPP TS 28.105, V17.0.0, Jun. 2022, pp. 1-33.

"3rd Generation Partnership Project; Technical Specification Group Services and System Aspects, Study of Enablers for Network Automation for 5G 5G System (5GS); Phase 3 (Release 18)", 3GPP TR 23.700-81, V0.3.0, May 2022, pp. 1-191.

"3rd Generation Partnership Project; Technical Specification Group Services and System Aspects; Management and orchestration; Study on Artificial Intelligence / Machine Learning (AI/ML) management (Release 18)", 3GPP TS 28.908, V0.3.0, Jul. 2022, pp. 1-20.

"3rd Generation Partnership Project; Technical Specification Group Services and System Aspects; Management and orchestration; Levels of autonomous network; (Release 17)", 3GPP TS 28.100, V17.0.0, Dec. 2021, pp. 1-34.

Office action received for corresponding Finnish Patent Application No. 20235062, dated Jul. 24, 2023, 14 pages.

Office action received for corresponding Finnish Patent Application No. 20235062, dated Nov. 17, 2023, 12 pages.

* cited by examiner

METHOD AND APPARATUS FOR FEDERATED TRAINING

FIELD

The disclosure relates to apparatuses and methods for applying federated learning in a distributed setting.

BACKGROUND

Federated learning is a paradigm in which a machine learning model is trained in a distributed setting with a central trainer and remote distributed trainers.

The distributed trainers compute training gradients using the machine learning model and local data and transmit said training gradients to the central trainer. The central trainer then updates the machine learning model using the training gradients.

Federated learning ensures data privacy, as data from the remote distributed trainers is not transferred to the central trainer. However, the machine learning model is disclosed to distributed trainers which may be corrupted or untrustworthy.

Thus, there is a need for apparatuses and methods which can perform federated learning while ensuring a confidentiality of the machine learning model.

SUMMARY

In some embodiments, the disclosure provides an apparatus for federated training. The apparatus comprises means for:

- Transmitting a first implementation of a data-processing model to a first distributed trainer, wherein the first implementation of the data-processing model comprises a first hidden part and a first open part, wherein parameters of the first hidden part are not accessible to the first distributed trainer, wherein the first distributed trainer has access to a first dataset embedded in a first remote device,
- Transmitting a second implementation of the data-processing model to a second distributed trainer, wherein the second implementation of the data-processing model comprises a second hidden part and a second open part, wherein parameters of the second hidden part are not accessible to the second distributed trainer, wherein the second distributed trainer has access to a second dataset embedded in a second remote device,
- Receiving a first training gradient from the first distributed trainer and a second training gradient from the second distributed trainer, wherein the first gradient is computed using the first implementation of the data-processing model and the first dataset, wherein the first gradient relates to the first open part of the first implementation of the data-processing model, wherein the second gradient is computed using the second implementation of the data-processing model and the second dataset, wherein the second gradient relates to the second open part of the second implementation of the data-processing model,
- Updating the data-processing model using the first gradient and the second gradient.

Thanks to these features, the apparatus ensures an improved confidentiality of the data-processing model.

The apparatus for federated training may also comprise one or more of the following features.

In an embodiment, the apparatus further comprises means for: after updating the data-processing model, iterating to the step of transmitting the first implementation and the second implementation of the updated data-processing model until the data-processing model fulfils a convergence criterion.

Thanks to these features, the apparatus ensures the confidentiality of the data-processing model during the federated training process.

In an embodiment, the apparatus further comprises means for:

- Associating a first trust score to the first distributed trainer and a second trust score to the second distributed trainer,
- Determining the first hidden part and the first open part as a function of the first trust score and the second hidden part and the second open part as a function of the second trust score,
- Wherein in response to the first trust score being greater than the second trust score, a number of parameters in the second hidden part is larger than a number of parameters in the first hidden part.

Thanks to these features, implementations of the data-processing model with a bigger open part are only disclosed to trusted distributed trainers.

In an embodiment, in response to the first trust score being greater than the second trust score, the second hidden part comprises the first hidden part.

In an embodiment, the data-processing model comprises a neural network, wherein the data-processing model comprises a plurality of layers of neurons and wherein the means for determining the first hidden part and the first open part further comprise means for determining a limit layer in the set of layers of neurons, wherein the first hidden part comprises at least one layer preceding the limit layer in the set of layers of neurons, and wherein the open part comprises the limit layer and at least one layer succeeding the limit layer in the set of layers of neurons.

Thanks to these features, the early layers may not need to be disclosed to the distributed trainers and may be kept confidential, as the early layers often encode generic features.

In an embodiment, the first hidden part of the data-processing model is a first executable file and the second hidden part of the data-processing model is a second executable file.

In an embodiment, the means for transmitting the first implementation of the data-processing model comprise means for encoding the first hidden part of the data-processing model into the first executable file and the second hidden part of the data-processing model into the second executable file.

Thanks to these features, the apparatus allows the first and second distributed trainers to use respectively the first and second hidden parts of the data-processing model to compute outputs of the data-processing model while keeping the first and second hidden parts confidential.

In an embodiment, the data-processing model is an encrypted version of an original data-processing model encrypted using a homomorphic encryption algorithm, wherein the data-processing model comprises a set of elementary blocks, wherein each of the set of elementary blocks belongs either to the first hidden part or to the first open part, wherein the means for updating the data-processing models comprise means for updating each of the set of elementary blocks in an intersection of the first and second open parts by combining the first and second training gradients.

Thanks to these features, the data-processing model may be kept confidential from the apparatus itself while allowing the apparatus to update the data-processing model after receiving the training gradients from the distributed trainers.

In an embodiment, the apparatus further comprises means for transmitting a third implementation of the data-processing model to a third distributed trainer, wherein parameters of the third implementation are not accessible to the third distributed trainer, wherein the third distributed trainer has access to a third dataset embedded in a third remote device.

Thanks to these features, the data-processing model may be made available for use to untrusted distributed trainers which are not allowed to contribute to training the data-processing model.

In an embodiment, the apparatus further comprises means for:

- Transmitting a third implementation of the data-processing model to a third distributed trainer, wherein parameters of the third implementation are accessible to the third distributed trainer, wherein the third distributed trainer has access to a third dataset embedded in a third remote device,
- Receiving a third training gradient from the third distributed trainer, wherein the third training gradient is computed using the third implementation of the data-processing model and the third dataset, wherein the third training gradient relates to the parameters of the third implementation of the data-processing model,
- Updating the data-processing model using the third training gradient.

Thanks to these features, the data-processing model may be entirely disclosed to and trained by trusted distributed trainers.

In an embodiment, the apparatus further comprises means for:

- Transmitting each implementation within a first set of implementations of the data-processing model to a respective distributed trainer within a first set of distributed trainers, wherein each respective distributed trainer has access to a respective dataset embedded in a respective remote device,
- Receiving a set of first elementary gradients from the first set of distributed trainers, wherein each of the first set of elementary gradients is computed by a respective distributed trainer in the first set of distributed trainers,
- Computing an intermediate gradient from the set of first elementary gradients,
- Updating the data-processing model using the first intermediate gradient and the second gradient.

In an embodiment, each implementation in the first set of implementations has a common open part and a common hidden part, wherein the respective distributed trainer has access to parameters of the common open part and does not have access to the parameters of the common hidden part, wherein the common open part and the common hidden part are common to all implementations in the first set of implementations.

Thanks to these features, the apparatus may operate in a hierarchical federated learning configuration.

In some example embodiments, the disclosure also provides a method for federated training, the method comprising the steps of:

- Transmitting a first implementation of a data-processing model to a first distributed trainer, wherein the first implementation of the data-processing model comprises a first hidden part and a first open part, wherein parameters of the first hidden part are not accessible to the first distributed trainer, wherein the first distributed trainer has access to a first dataset embedded in a first remote device,
- Transmitting a second implementation of the data-processing model to a second distributed trainer, wherein the second implementation of the data-processing model comprises a second hidden part and a second open part, wherein parameters of the second hidden part are not accessible to the second distributed trainer, wherein the second distributed trainer has access to a second dataset embedded in a second remote device,
- Receiving a first training gradient from the first distributed trainer and a second training gradient from the second distributed trainer, wherein the first gradient is computed using the first implementation of the data-processing model and the first dataset, wherein the first gradient relates to the first open part of the first implementation of the data-processing model, wherein the second gradient is computed using the second implementation of the data-processing model and the second dataset, wherein the second gradient relates to the second open part of the second implementation of the data-processing model,
- Updating the data-processing model using the first gradient and the second gradient.

The method for federated training may also comprise one or more of the following features.

In an embodiment, the method further comprises the steps of: after updating the data-processing model, iterating to the step of transmitting the first implementation and the second implementation of the updated data-processing model until the data-processing model fulfils a convergence criterion.

In an embodiment, the method further comprises the steps of:

- Associating a first trust score to the first distributed trainer and a second trust score to the second distributed trainer,
- Determining the first hidden part and the first open part as a function of the first trust score and the second hidden part and the second open part as a function of the second trust score,
- Wherein in response to the first trust score being greater than the second trust score, a number of parameters in the second hidden part is larger than a number of parameters in the first hidden part.

In an embodiment, in response to the first trust score being greater than the second trust score, the second hidden part comprises the first hidden part.

In an embodiment, the data-processing model comprises a neural network, wherein the data-processing model comprises a plurality of layers of neurons and wherein the means for determining the first hidden part and the first open part further comprise means for determining a limit layer in the set of layers of neurons, wherein the first hidden part comprises at least one layer preceding the limit layer in the set of layers of neurons, and wherein the open part comprises the limit layer and at least one layer succeeding the limit layer in the set of layers of neurons.

In an embodiment, the first hidden part of the data-processing model is a first executable file and the second hidden part of the data-processing model is a second executable file.

In an embodiment, the steps of transmitting the first implementation of the data-processing model comprise steps of encoding the first hidden part of the data-processing model into the first executable file and the second hidden part of the data-processing model into the second executable file.

In an embodiment, the data-processing model is an encrypted version of an original data-processing model encrypted using a homomorphic encryption algorithm, wherein the data-processing model comprises a set of elementary blocks, wherein each of the set of elementary blocks belongs either to the first hidden part or to the first open part, wherein the means for updating the data-processing models comprise means for updating each of the set of elementary blocks in an intersection of the first and second open parts by combining the first and second training gradients.

In an embodiment, the method further comprises the steps of transmitting a third implementation of the data-processing model to a third distributed trainer, wherein parameters of the third implementation are not accessible to the third distributed trainer, wherein the third distributed trainer has access to a third dataset embedded in a third remote device.

In an embodiment, the method further comprises the steps of:

Transmitting a third implementation of the data-processing model to a third distributed trainer, wherein parameters of the third implementation are accessible to the third distributed trainer, wherein the third distributed trainer has access to a third dataset embedded in a third remote device, Receiving a third training gradient from the third distributed trainer, wherein the third training gradient is computed using the third implementation of the data-processing model and the third dataset, wherein the third training gradient relates to the parameters of the third implementation of the data-processing model, Updating the data-processing model using the third training gradient.

In an embodiment, the apparatus further comprises means for:

Transmitting each implementation within a first set of implementations of the data-processing model to a respective distributed trainer within a first set of distributed trainers, wherein each respective distributed trainer has access to a respective dataset embedded in a respective remote device, Receiving a set of first elementary gradients from the first set of distributed trainers, wherein each of the first set of elementary gradients is computed by a respective distributed trainer in the first set of distributed trainers, Computing an intermediate gradient from the set of first elementary gradients, Updating the data-processing model using the first intermediate gradient and the second gradient.

In an embodiment, each implementation in the first set of implementations has a common open part and a common hidden part, wherein the respective distributed trainer has access to parameters of the common open part and does not have access to the parameters of the common hidden part, wherein the common open part and the common hidden part are common to all implementations in the first set of implementations.

In some example embodiments, the means in the apparatus further comprises:

At least one processor; and

At least one memory including a computer program code, the at least one memory and computer program code configured to, with the at least one processor, cause the operations of the apparatus.

The at least one memory and the computer program code may be configured to, with the at least one processor, cause the apparatus to:

Transmit a first implementation of a data-processing model to a first distributed trainer, wherein the first implementation of the data-processing model comprises a first hidden part and a first open part, wherein parameters of the first hidden part are not accessible to the first distributed trainer, wherein the first distributed trainer has access to a first dataset embedded in a first remote device, Transmit a second implementation of the data-processing model to a second distributed trainer, wherein the second implementation of the data-processing model comprises a second hidden part and a second open part, wherein parameters of the second hidden part are not accessible to the second distributed trainer, wherein the second distributed trainer has access to a second dataset embedded in a second remote device, Receive a first training gradient from the first distributed trainer and a second training gradient from the second distributed trainer, wherein the first gradient is computed using the first implementation of the data-processing model and the first dataset, wherein the first gradient relates to the first open part of the first implementation of the data-processing model, wherein the second gradient is computed using the second implementation of the data-processing model and the second dataset, wherein the second gradient relates to the second open part of the second implementation of the data-processing model, Update the data-processing model using the first gradient and the second gradient.

In an embodiment, the at least one memory and the computer program code may further be configured to, with the at least one processor, cause the apparatus, after updating the data-processing model, to iterate to the means for transmitting the first implementation and the second implementation of the updated data-processing model until the data-processing model fulfils a convergence criterion.

In an embodiment, the at least one memory and the computer program code may further be configured to, with the at least one processor, cause the apparatus to:

Associate a first trust score to the first distributed trainer and a second trust score to the second distributed trainer, Determine the first hidden part and the first open part as a function of the first trust score and the second hidden part and the second open part as a function of the second trust score, Wherein in response to the first trust score being greater than the second trust score, a number of parameters in the second hidden part is larger than a number of parameters in the first hidden part.

In an embodiment, in response to the first trust score being greater than the second trust score, the second hidden part comprises the first hidden part.

In an embodiment, the data-processing model comprises a neural network, wherein the data-processing model comprises a plurality of layers of neurons and wherein the means for determining the first hidden part and the first open part further comprise means for determining a limit layer in the set of layers of neurons, wherein the first hidden part comprises at least one layer preceding the limit layer in the set of layers of neurons, and wherein the open part comprises the limit layer and at least one layer succeeding the limit layer in the set of layers of neurons.

In an embodiment, the first hidden part of the data-processing model is a first executable file and the second hidden part of the data-processing model is a second executable file.

In an embodiment, the means for transmitting the first implementation of the data-processing model comprise means for encoding the first hidden part of the data-processing model into the first executable file and the second hidden part of the data-processing model into the second executable file.

In an embodiment, the data-processing model is an encrypted version of an original data-processing model encrypted using a homomorphic encryption algorithm, wherein the data-processing model comprises a set of elementary blocks, wherein each of the set of elementary blocks belongs either to the first hidden part or to the first open part, wherein the means for updating the data-processing models comprise means for updating each of the set of elementary blocks in an intersection of the first and second open parts by combining the first and second training gradients.

In an embodiment, the at least one memory and the computer program code may further be configured to, with the at least one processor, cause the apparatus to transmit a third implementation of the data-processing model to a third distributed trainer, wherein parameters of the third implementation are not accessible to the third distributed trainer, wherein the third distributed trainer has access to a third dataset embedded in a third remote device.

In an embodiment, the at least one memory and the computer program code may further be configured to, with the at least one processor, cause the apparatus to:

Transmit a third implementation of the data-processing model to a third distributed trainer, wherein parameters of the third implementation are accessible to the third distributed trainer, wherein the third distributed trainer has access to a third dataset embedded in a third remote device, Receive a third training gradient from the third distributed trainer, wherein the third training gradient is computed using the third implementation of the data-processing model and the third dataset, wherein the third training gradient relates to the parameters of the third implementation of the data-processing model, Update the data-processing model using the third training gradient.

In an embodiment, the at least one memory and the computer program code may further be configured to, with the at least one processor, cause the apparatus to:

Transmit each implementation within a first set of implementations of the data-processing model to a respective distributed trainer within a first set of distributed trainers, wherein each respective distributed trainer has access to a respective dataset embedded in a respective remote device, Receive a set of first elementary gradients from the first set of distributed trainers, wherein each of the first set of elementary gradients is computed by a respective distributed trainer in the first set of distributed trainers, Compute an intermediate gradient from the set of first elementary gradients, Update the data-processing model using the first intermediate gradient and the second gradient.

In an embodiment, each implementation in the first set of implementations has a common open part and a common hidden part, wherein the respective distributed trainer has access to parameters of the common open part and does not have access to the parameters of the common hidden part, wherein the common open part and the common hidden part are common to all implementations in the first set of implementations.

In some embodiments, the disclosure also provides an apparatus for federated training comprising:

A first transmitting circuitry configured to transmit a first implementation of a data-processing model to a first distributed trainer, wherein the first implementation of the data-processing model comprises a first hidden part and a first open part, wherein parameters of the first hidden part are not accessible to the first distributed trainer, wherein the first distributed trainer has access to a first dataset embedded in a first remote device, A second transmitting circuitry configured to transmit a second implementation of the data-processing model to a second distributed trainer, wherein the second implementation of the data-processing model comprises a second hidden part and a second open part, wherein parameters of the second hidden part are not accessible to the second distributed trainer, wherein the second distributed trainer has access to a second dataset embedded in a second remote device, A first receiving circuitry configured to receive a first training gradient from the first distributed trainer and a second training gradient from the second distributed trainer, wherein the first gradient is computed using the first implementation of the data-processing model and the first dataset, wherein the first gradient relates to the first open part of the first implementation of the data-processing model, wherein the second gradient is computed using the second implementation of the data-processing model and the second dataset, wherein the second gradient relates to the second open part of the second implementation of the data-processing model, A first updating circuitry configured to update the data-processing model using the first gradient and the second gradient.

The apparatus for federated training may also comprise one or more of the following features.

In an embodiment, the apparatus further comprises an iterating circuitry configured to iterate, after updating the data-processing model, to the step of transmitting the first implementation and the second implementation of the updated data-processing model until the data-processing model fulfils a convergence criterion.

In an embodiment, the apparatus further comprises:

An associating circuitry configured to associate a first trust score to the first distributed trainer and a second trust score to the second distributed trainer, A determining circuitry configured to determine the first hidden part and the first open part as a function of the first trust score and the second hidden part and the second open part as a function of the second trust score, Wherein in response to the first trust score being greater than the second trust score, a number of parameters in the second hidden part is larger than a number of parameters in the first hidden part.

In an embodiment, the first transmitting circuitry comprises an encoding circuitry configured to encode the first hidden part of the data-processing model into the first executable file and the second hidden part of the data-processing model into the second executable file.

In an embodiment, the data-processing model is an encrypted version of an original data-processing model encrypted using a homomorphic encryption algorithm, wherein the data-processing model comprises a set of elementary blocks, wherein each of the set of elementary blocks belongs either to the first hidden part or to the first open part. In this embodiment, the first updating circuitry comprises a second updating circuitry configured to update each of the set of elementary blocks in an intersection of the first and second open parts by combining the first and second training gradients.

In an embodiment, the apparatus further comprises a third transmitting circuitry configured to transmit a third implementation of the data-processing model to a third distributed trainer, wherein parameters of the third implementation are not accessible to the third distributed trainer, wherein the third distributed trainer has access to a third dataset embedded in a third remote device.

In an embodiment, the apparatus further comprises:

A third transmitting circuitry configured to transmit a third implementation of the data-processing model to a third distributed trainer, wherein parameters of the third implementation are accessible to the third distributed trainer, wherein the third distributed trainer has access to a third dataset embedded in a third remote device, A second receiving circuitry configured to receive a third training gradient from the third distributed trainer, wherein the third training gradient is computed using the third implementation of the data-processing model and the third dataset, wherein the third training gradient relates to the parameters of the third implementation of the data-processing model, A third updating circuitry configured to update the data-processing model using the third training gradient.

In an embodiment, the apparatus further comprises:

A fourth transmitting circuitry configured to transmit each implementation within a first set of implementations of the data-processing model to a respective distributed trainer within a first set of distributed trainers, wherein each respective distributed trainer has access to a respective dataset embedded in a respective remote device, A third receiving circuitry configured to receive a set of first elementary gradients from the first set of distributed trainers, wherein each of the first set of elementary gradients is computed by a respective distributed trainer in the first set of distributed trainers, A computing circuitry configured to compute an intermediate gradient from the set of first elementary gradients, A fourth updating circuitry configured to update the data-processing model using the first intermediate gradient and the second gradient.

BRIEF DESCRIPTION OF THE DRAWINGS

These and other aspects of the invention will be apparent from and elucidated with reference to example embodiments described hereinafter, by way of example, with reference to the drawings.

DETAILED DESCRIPTION OF THE EMBODIMENTS

Figure 1:
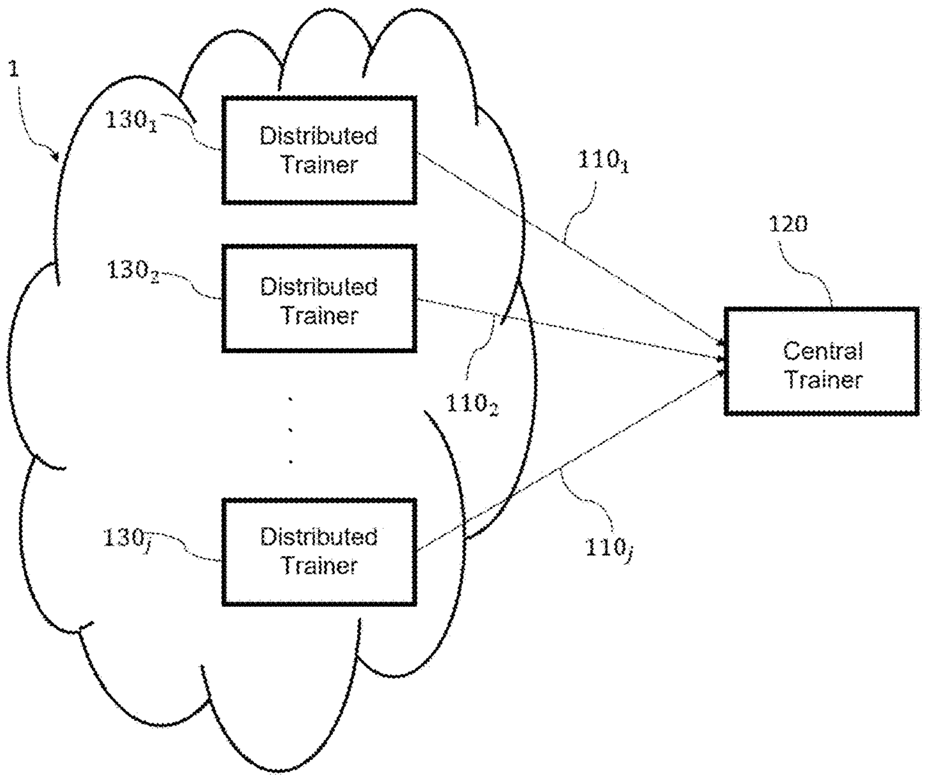
FIG. 1 represents a schematic view of distributed trainers in communication with a remote infrastructure in a telecommunications network.

FIG. 1 represents a plurality of distributed trainers 130$_1$, 130$_2$, . . . , 130$_j$ in a telecommunications network 1. The distributed trainers 130$_1$, 130$_2$, . . . , 130$_j$ are in communication with a central trainer 120, the central trainer being embedded in a remote infrastructure.

The distributed trainers may be network elements. The remote infrastructure may be on premise or may be deployed in a cloud. The remote infrastructure may exchange data and receive telemetry data streams from the distributed trainers. The data streams may be near real-time or batches.

In a federated learning configuration, the central trainer 120 may transmit a data-processing model to the distributed trainers 130$_1$, 130$_2$, . . . , 130$_j$. Each of the distributed trainers 130$_1$, 130$_2$, . . . , 130$_j$ has access to local data and may train the data-processing model on the respective local data. Each of the distributed trainers 130$_1$, 130$_2$, . . . , 130$_j$ may compute a respective training gradient 110$_1$, 110$_2$, . . . , 110$_j$ and send it to the central trainer 120.

According to an embodiment, the training gradients are values which will be used to update parameters of the data-processing model. In the case of the data-processing model being a neural network, the training gradients are computed by backpropagation.

According to an embodiment, the training gradients 110$_1$, 110$_2$, . . . , 110$_j$ are updated parameters of the data-processing model, such as weights of neurons.

The central trainer 120 may combine the training gradients 110$_1$, 110$_2$, . . . , 110$_j$ by performing a sum, an average or a weighted average, for example, and compute an updated data-processing model with the training gradients 110$_1$, 110$_2$, . . . , 110$_j$. The central trainer may then transmit the updated data-processing model to the distributed trainers 130$_1$, 130$_2$, . . . , 130$_j$ for a new training phase and may repeat the aforementioned steps until a convergence criterion is reached. The convergence criterion may be a number of iterations or an accuracy or recall of the data-processing model, for example. The telecommunications network 1 maybe any type of network, e.g. fixed or mobile. The distributed trainers 130$_1$, 130$_2$, . . . , 130$_j$ are connected by communication links not shown, e.g. optical links, radio links, wired links, etc. In a cellular network, the distributed trainers 130$_1$, 130$_2$, . . . , 130$_j$ may comprise telecommunications network equipment such as Base Station Controllers, Base Station Control Functions, Base Station Transceiver Stations, Transceivers. The distributed trainers 130$_1$, 130$_2$, . . . , 130$_j$ may comprise physical or logical entities, on hardware or software.

The distributed trainers 130$_1$, 130$_2$, . . . , 130$_j$ may comprise edge devices or remote devices and may comprise hardware or software. Examples of distributed trainers include smart connected objects, mobile devices or applications. The central trainer 120 may be implemented on a server and the server may be on premise or on the cloud. The distributed trainers 130$_1$, 130$_2$, . . . , 130$_j$ are chosen among a plurality of users or monitored equipment.

The remote infrastructure 120 may be on premise or may be deployed in a cloud. The remote infrastructure 120 may receive telemetry data streams from the network elements. The data streams may be near real-time or batches.

A number of distributed trainers monitored by the remote infrastructure 120 may range up to millions. The remote infrastructure may have access to distributed trainer metadata associated with the distributed trainers $\mathbf{130}_1$, $\mathbf{130}_2$, . . . , $\mathbf{130}_j$. The distributed trainer metadata may comprise attributes relating to the physical features of the distributed trainers $\mathbf{130}_1$, $\mathbf{130}_2$, . . . , $\mathbf{130}_j$ and an environment of said distributed trainers $\mathbf{130}_1$, $\mathbf{130}_2$, . . . , $\mathbf{130}_j$, for example a geographical area, a software version, a manufacturer of the distributed trainer.

Figure 2:
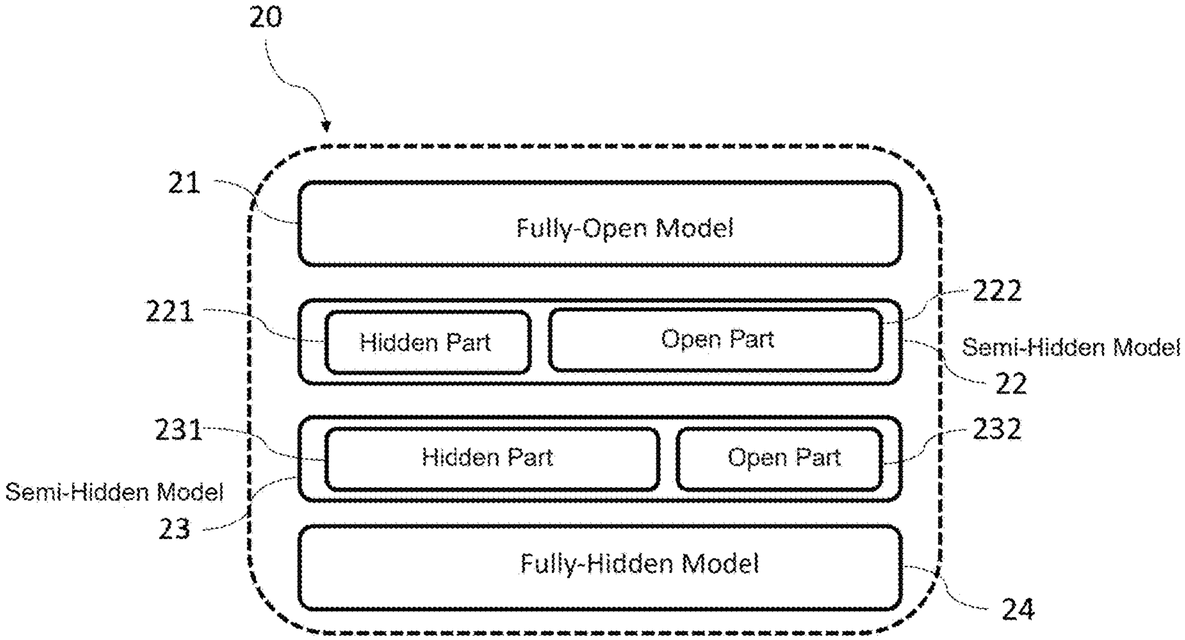
FIG. 2 represents a schematic view of a set of implementations of a data-processing model embedded in a central trainer in the remote infrastructure according to an embodiment.

With reference to FIG. 2, a set of implementations 20 of the data-processing model is described in further details. The set of implementations 20 of the data-processing model is embedded in the central trainer.

Implementations in the set of implementations 20 have the same parameters. In a federated learning configuration, all the implementations of the set of implementations are updated at the end of a training phase.

The implementations in the set of implementations 20 comprise a hidden part and an open part. A user of the implementation may have access to parameter values and structure of the open part. However, the user of the implementation does not have access to parameters and the structure of the hidden part.

Software engineering techniques may be used to encode the hidden part so that the parameters and structure of the hidden part are not accessible to the user. For example, the hidden part may be placed in an encapsulation unit. According to an embodiment, encryption and conversion into a binary format are used so that the hidden part is encoded in an executable file. The hidden part of the implementation may be used as a black box by the distributed trainers.

Implementations in the set of implementations 20 differ by the relative sizes of the hidden part and the open part. The set of implementations 20 may also comprise a fully open implementation, the fully open implementation comprising no hidden part, or a fully hidden implementation, the fully hidden implementation comprising no open part.

Each of the distributed trainers $\mathbf{130}_1$, $\mathbf{130}_2$, . . . , $\mathbf{130}_j$ receives an implementation from the set of implementations 20. Several distributed trainers $\mathbf{130}_1$, $\mathbf{130}_2$, . . . , $\mathbf{130}_j$ may receive the same implementation from the set of implementations 20.

The distributed trainers $\mathbf{130}_1$, $\mathbf{130}_2$, . . . , $\mathbf{130}_j$ perform training on the open part of the respective implementation from the set of implementations 20 received from the central trainer 20. Thus, each of the training gradients $\mathbf{110}_1$, $\mathbf{110}_2$, . . . , $\mathbf{110}_j$ relates to the open part of the respective implementation received by the respective distributed trainer.

For each parameter of the data-processing model, the central trainer 120 may combine the training gradients available for said parameter, i.e. the training gradients relating to implementations in which said parameter belongs to the open part. The central trainer 120 may then update the data-processing model and compute a new set of implementations 20 of the data-processing model by encoding parts of the updated data-processing model to render them inaccessible. The central trainer 120 may then start a new training phase until a convergence criterion is reached.

According to an embodiment, the set of implementations 20 comprises four models: a fully open model 21, a first semi-hidden model 22, a second semi-hidden model 23 and a fully hidden model 24.

All parameters of the fully open model 21 are accessible. The first semi-hidden model 22 comprises a first hidden part 221 and a first open part 222. The second semi-hidden model 23 comprises a second hidden part 231 and a second open part 232. The parameters of the fully hidden model 24 are encoded and inaccessible.

The second hidden part of the second semi-hidden model 22 comprises the first hidden part of the first semi-hidden model 21.

Determining the implementation sent to each distributed trainer may rely on a trust score associated with each distributed trainer. Metadata associated with distributed trainers, such as a manufacturer, a software/hardware specification or an area of the distributed trainer, may be used to establish such trust scores. For example, if a distributed trainer is manufactured by the same company as the central trainer, the distributed trainer may receive a very high trust score. On the other hand, distributed trainers from external manufacturers may be associated an empiric, lower trust score (unless a formal agreement exists between manufacturers, which would increase a trust level in the distributed trainer).

An analysis of the distributed trainers may also be carried out. If anomalies are detected and/or if a behavior of the distributed trainer is consistent with a malicious behavior, the distributed trainer may be associated with a low trust score.

The fully open model 21 maybe sent to distributed trainers with a high trust score only. On the other end of the spectrum, distributed trainers with a very low trust score may not be invited to participate in the training. As the distributed trainers with a very low trust score would only need to use the data-processing model for inference, the central trainer 120 may send said distributed trainers the fully hidden model 24.

Other distributed trainers may receive the first semi-hidden model 21 or the second semi-hidden model 22. A first distributed trainer with a higher trust score than a second distributed trainer may receive the first semi-hidden model 21, while the second distributed trainer receives the second semi-hidden model 22.

An advantage of such a configuration is an improved confidentiality of the data-processing model. Indeed, only highly trusted distributed trainers have access to the entire model, which reduces the risk of disclosure of the structure and parameters of the data-processing model to unauthorized third parties.

According to an embodiment, the data-processing model is a deep neural network, comprising a set of layers arranged sequentially. The data-processing model may be a recurring neural network, a convolutional neural network, a dense neural network, etc. The data-processing model may be used for classification or regression, for example.

According to an embodiment, the hidden part of an implementation comprises a first subset of layers from the first layer to a limit layer and the open part of the implementation comprises a second subset of layers from the limit layer to the last layer.

Such a configuration is advantageous as the last layers are often the layers that are specific to a given application. Thus, the last layers are often the most important layers to train. The early layers may be frozen, for example when using transfer learning.

However, other embodiments may be envisioned. For example, the hidden part may be a subset of middle layers or of the last layers.

Moreover, the invention may be applied to other types of models, for example decision trees.

Figure 3:
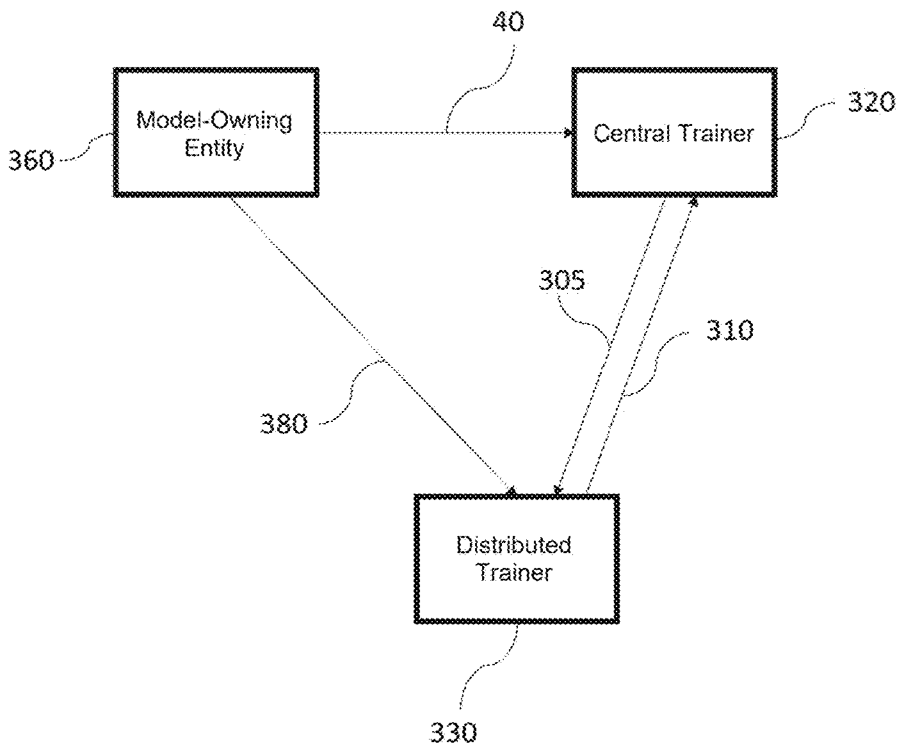
FIG. 3 represents a schematic view of a model owner in communication with the central trainer and a distributed trainer.

With reference to FIG. 3, a model-owning entity 360 may provide the central trainer 320 with the data-processing model. In case of concerns of confidentiality and data security in the central trainer 320, the model-owning entity 360 may send a set of encrypted implementations 40 of the data-processing model to the central trainer 320.

According to an embodiment, the data-processing model is encrypted using a homomorphic encryption algorithm. Details about federated learning using homomorphic encryption may be found on a June 2021 article from the NVIDIA Developer Technical Blog, titled "Federated Learning with Homomorphic Encryption", by Holger Roth, Michael Zephyr and Ahmed Harouni (https://developer.nvidia.com/blog/federated-learning-with-homomorphic-encryption/).

The central trainer 320 transmits an implementation 305 of the encrypted data-processing model to a distributed trainer 330. The model-owning entity 360 provides the distributed trainer 330 with means to decrypt the data-processing model 305, for example a key 380.

The distributed trainer 330 decrypts the implementation 305, which comprises a hidden part and an open part. The distributed trainer 330 performs training on the open part of the implementation 305 and computes a training gradient. The distributed trainer 330 sends the central trainer 320 an encrypted training gradient 310 computed using the homomorphic encryption algorithm.

As homomorphic encryption preserves mathematical operations, the central trainer 320 updates the encrypted data-processing model using the encrypted training gradient 310.

Figure 4:
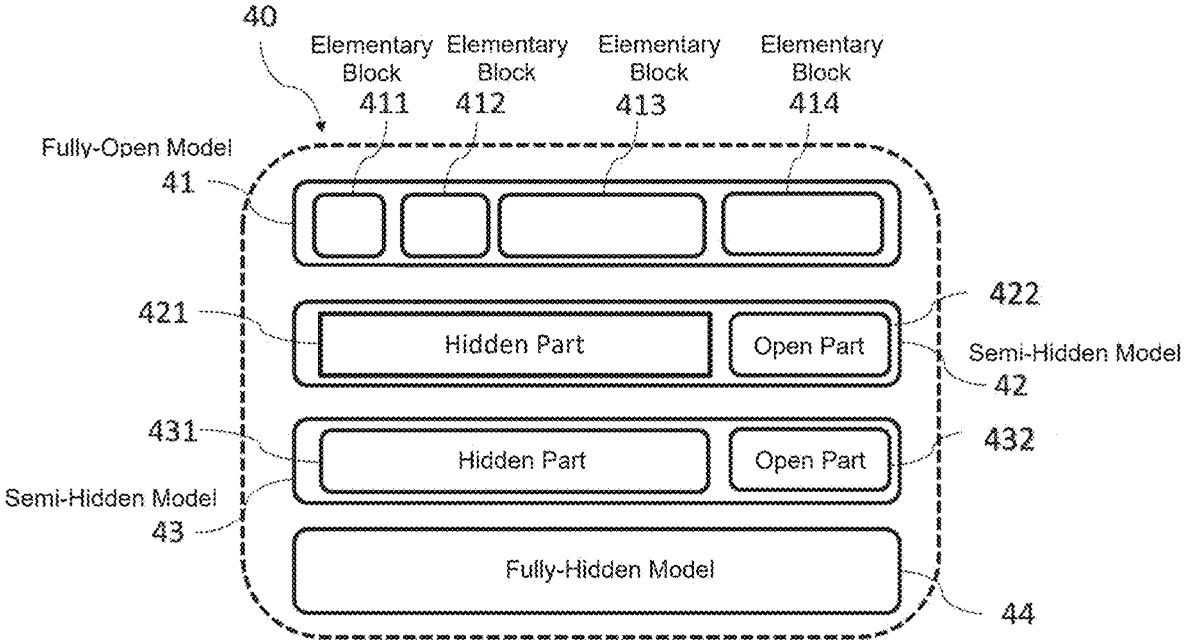
FIG. 4 represents a schematic view of the set of implementations of the data-processing model in the embodiment of FIG. 4.

With reference to FIG. 4, the set of implementations 40 is described in further details according to an embodiment. The data-processing model is split into elementary blocks. In any implementation of the data-processing model, an elementary block belongs either entirely to the hidden part or entirely to the open part. The elementary blocks may be of various sizes.

The set of implementations 40 comprises a fully open model 41, a first semi-hidden model 42, a second semi-hidden model 43 and a fully hidden model 44. The set of implementations may also comprise more implementations.

According to an embodiment, the model-owning entity 360 may send the central trainer 320 additional information along with the set of encrypted implementations 40. The additional information may comprise a description of the elementary blocks (for example a number of layers or a description of the type of layers included in the elementary blocks), an identifier of distributed trainers destined to receive a given implementation from the set of encrypted implementations, an aggregation strategy (for example, an average or weighted average).

The additional information may also comprise timing constraints, such as a maximum delay in receiving updates from distributed trainers that can be tolerated. The timing constraints may also relate to a federated learning approach selected, for example synchronous federated learning or asynchronous federated learning.

The additional information may also comprise reporting preferences. According to an embodiment, the central trainer 320 must update the model-owning entity 360 after each training iteration.

The fully open model 41 comprises the elementary blocks 411, 412, 413 and 414. For implementations comprising a hidden part, the hidden part is a fusion of a plurality of elementary blocks.

The first semi-hidden model 42 comprises a first hidden part 421 which comprises an executable file comprising the elementary blocks 411 and 412. The first semi-hidden model 43 comprises a first open part 422 comprising the elementary blocks 413 and 414.

The second semi-hidden model 43 comprises a second hidden part 431 which comprises an executable file comprising the elementary blocks 411, 412 and 413. The second semi-hidden model 43 comprises a second open part 432 comprising the elementary block 414.

The fully hidden model 44 comprises an executable file comprising the elementary blocks 411, 412, 413 and 414.

When the central trainer 320 receives the encrypted training gradient 310, the central trainer 320 may update the encrypted data-processing model elementary block by elementary block. Indeed, the encrypted training gradient 310 relates to the elementary blocks in the open part of the implementation 305. As the encrypted training gradient 310 relates to clearly identified elementary blocks, the encrypted training gradient may update each elementary block in the encrypted data-processing model, even though the elementary blocks are also encrypted.

Figure 5:
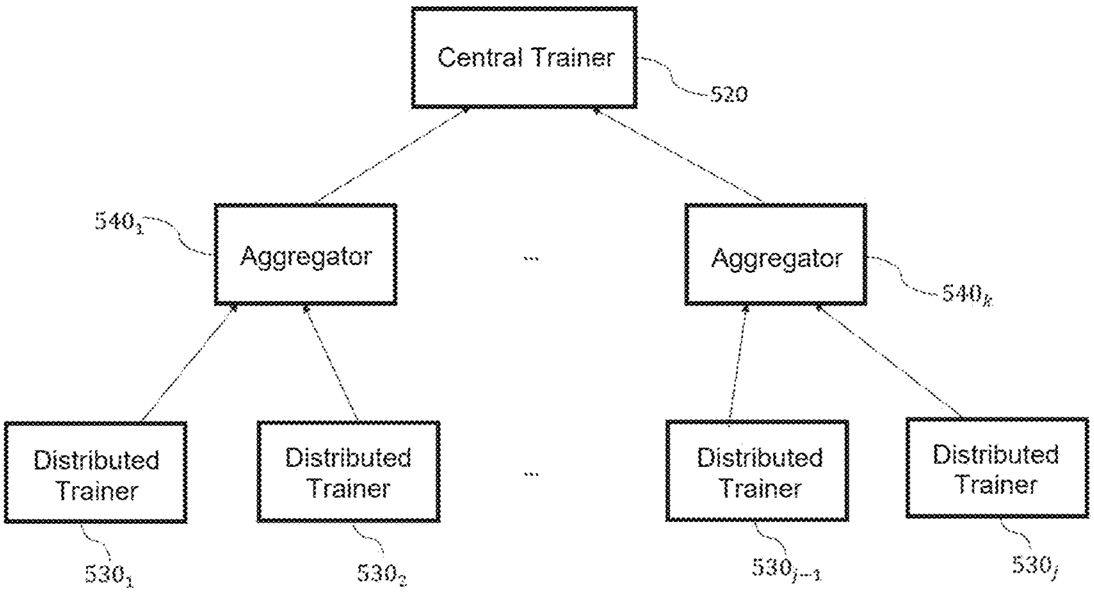
FIG. 5 represents the central trainer and the distributed trainers according to an embodiment.

With reference to FIG. 5, the central trainer 520 and the distributed trainers $\mathbf{530}_1$, $\mathbf{530}_2$, . . . , $\mathbf{530}_j$ may be in a hierarchical federated learning configuration. A set of intermediate aggregators $\mathbf{540}_1$, $\mathbf{540}_2$, . . . , $\mathbf{540}_k$ is placed between the distributed trainers $\mathbf{530}_1$, $\mathbf{530}_2$, . . . , $\mathbf{530}_j$ and the central trainer 520.

Each intermediate aggregator communicates with a subset of the distributed trainers $\mathbf{530}_1$, $\mathbf{530}_2$, . . . , $\mathbf{530}_j$. The intermediate aggregators $\mathbf{540}_1$, $\mathbf{540}_2$, . . . , $\mathbf{540}_k$ receive elementary training gradients computed by the distributed trainers $\mathbf{530}_1$, $\mathbf{530}_2$, . . . , $\mathbf{530}_j$ and combine the elementary training gradients into intermediate training gradients. The central trainer 520 receives the intermediate training gradients and combines them in order to update the data-processing model.

Subsets of the distributed trainers $\mathbf{530}_1$, $\mathbf{530}_2$, . . . , $\mathbf{530}_j$ associated with the intermediate aggregators $\mathbf{540}_1$, $\mathbf{540}_2$, . . . , $\mathbf{540}_k$ may be of various sizes.

According to an embodiment, the subsets of the distributed trainers $\mathbf{530}_1$, $\mathbf{530}_2$, . . . , $\mathbf{530}_j$ associated with the intermediate aggregators $\mathbf{540}_1$, $\mathbf{540}_2$, . . . , $\mathbf{540}_k$ are determined using the trust scores of the distributed trainers $\mathbf{530}_1$, $\mathbf{530}_2$, . . . , $\mathbf{530}_j$. For example, a subset of the distributed trainers $\mathbf{540}_1$, $\mathbf{540}_2$, . . . , $\mathbf{540}_k$ may comprise distributed trainers with identical or similar trust scores.

According to an embodiment, each distributed trainer in the subset of the distributed trainers $\mathbf{530}_1$, $\mathbf{530}_2$, . . . , $\mathbf{530}_j$ receives the same implementation of the data-processing model. According to this embodiment, the intermediate training gradient may be computed by averaging the elementary training gradients.

Figure 6:
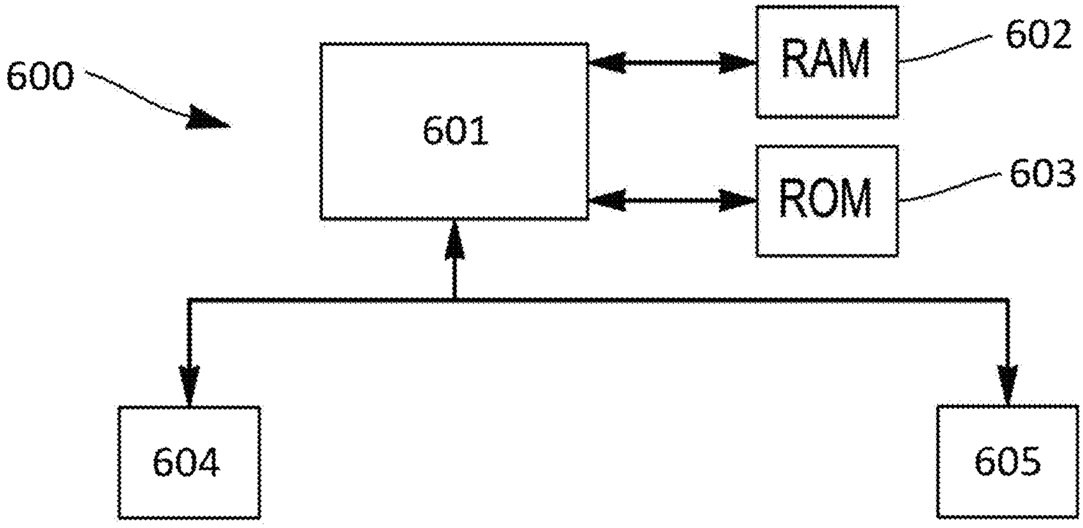
FIG. 6 is a functional diagram of a programmed computer in which example embodiments of the invention may be implemented.

FIG. 6 shows a functional diagram of a programmed computer, server, circuitry, or apparatus 600 that may be used for implementing the above-described anomaly detection apparatus. Computer 600 has a core and several peripherals connected via a communication bus. The major components of the core are a microprocessor 601 (often called the CPU) random access memory (RAM) 602 and read only memory (ROM) 603. The peripherals comprise devices that allow information to be input to the system from users, output to users and stored and retrieved (mass storage devices 604 such as hard disks and network interfaces 605).

The invention is not limited to the described example embodiments. The appended claims are to be construed as embodying all modifications and alternative constructions that may occur to one skilled in the art, and which fairly fall within the basic teaching as set forth herein.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Elements such as the apparatus and its components could be or include e.g. hardware means like e.g. an Application-Specific Integrated Circuit (ASIC), or a combination of hardware and software means, e.g. an ASIC and a Field-Programmable Gate Array (FPGA), or at least one microprocessor and at least one memory with software modules located therein, e.g. a programmed computer.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The example embodiments may be implemented by means of hardware as well as software. The same item of hardware may represent several "means".

In the claims, any reference signs placed between parentheses shall not be construed as limiting the scope of the claims.

The invention claimed is:

1. An apparatus (120, 320, 520) for federated training, the apparatus comprising at least one processing core, at least one non-transitory memory including computer program code, the at least one memory and the computer program code being configured to, with the at least one processing core, to configure the apparatus for:

Transmitting a first implementation (22, 42) of a data-processing model to a first distributed trainer (130, 330, 530), wherein the first implementation of the data-processing model comprises a first hidden part (221, 421) and a first open part (222, 422), wherein parameters of the first hidden part (221, 421) are not accessible to the first distributed trainer, wherein the first distributed trainer has access to a first dataset embedded in a first remote device, Transmitting a second implementation of the data-processing model to a second distributed trainer (130, 330, 530), wherein the second implementation (23, 43) of the data-processing model comprises a second hidden part (231, 431) and a second open part (232, 432), wherein parameters of the second hidden part (231; 431 are not accessible to the second distributed trainer, wherein the second distributed trainer has access to a second dataset embedded in a second remote device, Receiving a first training gradient (110, 310) from the first distributed trainer (130, 330, 530) and a second training gradient (110, 310) from the second distributed trainer, wherein the first gradient is computed using the first implementation (22, 42) of the data-processing model and the first dataset, wherein the first gradient relates to the first open part (222, 422) of the first implementation (22, 42) of the data-processing model, wherein the second gradient is computed using the second implementation (23, 43) of the data-processing model and the second dataset, wherein the second gradient relates to the second open part (232, 432) of the second implementation (23, 43) of the data-processing model, Updating the data-processing model using the first gradient (110, 310) and the second gradient, Associating a first trust score to the first distributed trainer (130, 330, 530) and a second trust score to the second distributed trainer (130, 330, 530), Determining the first hidden part (221, 421) and the first open part (222, 422) as a function of the first trust score and the second hidden part (231, 431) and the second open part (232, 432) as a function of the second trust score, Wherein in response to the first trust score being greater than the second trust score, a number of parameters in the second hidden part (231, 431) is larger than a number of parameters in the first hidden part (221, 421).

2. An apparatus (120, 320, 520) according to claim 1, wherein the apparatus is further configured for:

after updating the data-processing model, iterating to the step of transmitting the first implementation (22, 42) and the second implementation (23, 43) of the updated data-processing model until the data-processing model fulfils a convergence criterion.

3. An apparatus (120, 320, 520) according to claim 1, wherein in response to the first trust score being greater than the second trust score, the second hidden part (231, 431) comprises the first hidden part (221, 421).

4. An apparatus (120, 320, 520) according to claim 1, wherein the data-processing model comprises a neural network, wherein the data-processing model comprises a plurality of layers of neurons and wherein the apparatus is further configured for determining the first hidden part (221, 421) and the first open part (222, 422) and for determining a limit layer in the set of layers of neurons, wherein the first hidden part (221; 421) comprises at least one layer preceding the limit layer in the set of layers of neurons, and wherein the open part (222, 422) comprises the limit layer and at least one layer succeeding the limit layer in the set of layers of neurons.

5. An apparatus (120, 320, 520) according to claim 1, wherein the first hidden part (221; 421) of the data-processing model is a first executable file and the second hidden part (231, 431) of the data-processing model is a second executable file.

6. An apparatus (120, 320, 520) according to claim 5, wherein transmitting the first implementation (22, 42) of the data-processing model comprise further comprises encoding the first hidden part (221, 421) of the data-processing model into the first executable file and the second hidden part (222, 422) of the data-processing model into the second executable file.

7. An apparatus (120, 320, 520) according to claim 1, wherein the data-processing model is an encrypted version of an original data-processing model encrypted using a homomorphic encryption algorithm, wherein the data-processing model comprises a set of elementary blocks (411, 412, 413, 414), wherein each of the set of elementary blocks (411, 412, 413, 414) belongs either to the first hidden part (221, 421) or to the first open part (222, 422), wherein the apparatus is further configured for updating the data-processing models comprise means for updating each of the set of elementary blocks (411, 412, 413, 414) in an intersection of the first (222, 422) and second open parts (232, 432) by combining the first and second training gradients.

8. An apparatus (120, 320, 520) according to claim 1, wherein the apparatus is further configured for transmitting a third implementation (24, 44) of the data-processing model to a third distributed trainer, wherein parameters of the third implementation (24, 44) are not accessible to the third distributed trainer, wherein the third distributed trainer has access to a third dataset embedded in a third remote device.

9. An apparatus (120, 320, 520) according to claim 1, comprising means wherein the apparatus is further configured for:

Transmitting a third implementation (21, 41) of the data-processing model to a third distributed trainer, wherein parameters of the third implementation (21, 41) are accessible to the third distributed trainer, wherein the third distributed trainer has access to a third dataset embedded in a third remote device, Receiving a third training gradient from the third distributed trainer, wherein the third training gradient is computed using the third implementation (21, 41) of the data-processing model and the third dataset, wherein the third training gradient relates to the parameters of the third implementation (21, 41) of the data-processing model, Updating the data-processing model using the third training gradient.

10. An apparatus (520) according to claim 1, further comprising wherein the apparatus is further configured for:

Transmitting each implementation within a first set of implementations of the data-processing model to a respective distributed trainer (530) within a first set of distributed trainers, wherein each respective distributed trainer (530) has access to a respective dataset embedded in a respective remote device, Receiving a set of first elementary gradients from the first set of distributed trainers (530), wherein each of the first set of elementary gradients is computed by a respective distributed trainer in the first set of distributed trainers, Computing an intermediate gradient from the set of first elementary gradients, Updating the data-processing model using the first intermediate gradient and the second gradient.

11. An apparatus (120, 320, 520) according to claim 10, wherein each implementation in the first set of implementations has a common open part and a common hidden part, wherein the respective distributed trainer has access to parameters of the common open part and does not have access to the parameters of the common hidden part, wherein the common open part and the common hidden part are common to all implementations in the first set of implementations.

12. A computer-implemented method for federated training, the method comprising the steps of:

Transmitting a first implementation (22, 42) of a data-processing model to a first distributed trainer (130, 330, 530), wherein the first implementation of the data-processing model comprises a first hidden part (221, 421) and a first open part (222, 422), wherein parameters of the first hidden part (221, 421) are not accessible to the first distributed trainer, wherein the first distributed trainer has access to a first dataset embedded in a first remote device, Transmitting a second implementation of the data-processing model to a second distributed trainer (130, 330, 530), wherein the second implementation (23, 43) of the data-processing model comprises a second hidden part (231, 431) and a second open part (232, 432), wherein parameters of the second hidden part (231; 431) are not accessible to the second distributed trainer, wherein the second distributed trainer has access to a second dataset embedded in a second remote device, Receiving a first training gradient (110, 310) from the first distributed trainer (130, 330, 530) and a second training gradient (110, 310) from the second distributed trainer, wherein the first gradient is computed using the first implementation (22, 42) of the data-processing model and the first dataset, wherein the first gradient relates to the first open part (222, 422) of the first implementation (22, 42) of the data-processing model, wherein the second gradient is computed using the second implementation (23, 43) of the data-processing model and the second dataset, wherein the second gradient relates to the second open part (232, 432) of the second implementation (23, 43) of the data-processing model, Updating the data-processing model using the first gradient (110, 310) and the second gradient, Associating a first trust score to the first distributed trainer (130, 330, 530) and a second trust score to the second distributed trainer (130, 330, 530), Determining the first hidden part (221, 421) and the first open part (222, 422) as a function of the first trust score and the second hidden part (231, 431) and the second open part (232, 432) as a function of the second trust score, Wherein in response to the first trust score being greater than the second trust score, a number of parameters in the second hidden part (231, 431) is larger than a number of parameters in the first hidden part (221, 421).

13. A method according to claim 12, further comprising the steps of: after updating the data-processing model, iterating to the step of transmitting the first implementation (22, 42) and the second implementation (23, 43) of the updated data-processing model until the data-processing model fulfils a convergence criterion.

* * * * *